Patented Sept. 16, 1930

1,775,868

UNITED STATES PATENT OFFICE

ERNST G. SANDMEIER, OF LOCARNO, SWITZERLAND, ASSIGNOR TO SWISS JEWEL CO. S. A., OF LOCARNO, SWITZERLAND

SYNTHETIC GREEN SPINEL

No Drawing. Application filed February 28, 1928, Serial No. 257,796, and in Switzerland January 19, 1928.

The present invention relates to artificial spinels and has for its object to produce synthetically stones having the physical properties as regards hardness and structure as closely resembling the natural stone as possible but possessing a beautiful and permanent green colour which will remain the same in daylight and in artificial light.

Artificial green spinels have already been produced heretofore but, while looking bright in daylight they will present a dull aspect in artificial light, turning at the same time to red.

Therefore this invention consists in the production of a synthetic spinel which may be obtained in accordance with the disclosure found in Patents Nos. 988,230 and 1,004,505, granted to A. V. L. Verneuil March 28 and Sept. 26, 1911, respectively, and which is constituted of alumina, magnesium oxid titanium, and chromium oxid.

The constituent materials which are subjected to said process are mixed together in powder form and caused to fall through an oxy-hydrogen flame on a support of fire clay where they are fused and form the artificial stone by successive cap-shaped layers as is set forth in the second-named patent.

The proportions of the powdered ingredients are substantially 82.53% aluminium oxid, 16.506% magnesium oxid, 0.066% titanium and 0.12% chromium oxid, and could comprise, for instance, 100 grammes aluminium oxid, 20 grammes magnesium oxid, 0.08 grammes titanium and 0.12 grammes chromium oxid.

The ingredients however could also comprise other compounds of said materials than those just mentioned, because the high temperature of the flame would reduce any such compounds to the said oxids; and it would only be necessary, in order to maintain the true proportion of ingredients, to proportionate the ingredients according to the calculated chemical values of the substances.

The physical properties of the synthetic stone produced according to the present invention are, with the exception of the improved colour and transparency, very much like those set forth in the above-mentioned patent No. 1,004,505.

The synthetic stones produced by the above method and devices have a hardness of 7-8, diamond being 10, and may be distinguished on the market from the natural stones by observing the following differences in their physical characteristics:—Cracks or scratches are often seen in the natural stones under a high-power microscope, but they seem to be on the surface and resemble the parallel scratches made by a file on the edge of a glass plate. They are probably due to the cutting operation. In the synthetic stone, on the other hand, the cracks, when they occur, appear as genuine rifts beneath the surface, and are generally curved, due probably to the curved layers out of which the stone is formed. The layers comprising the natural stone are flat and parallel, while those of the synthetic stone are curved, as above stated. The specks or cavity-like spots appearing in the natural stone are bounded by angular or crystal-shaped walls, while those occurring in the synthetic stone have curved or bubble-like walls. The above characteristics in nearly all cases must be looked for with a high-power microscope. When cut, however, the transparency and other optical properties of the natural and synthetic stones may be considered identical.

What I claim as new is:

1. A synthetic spinel having a permanent green colour, containing 100 grammes aluminium oxid, 20 grammes magnesium oxid, 0.08 gramme titanium oxid, and 0.12 gramme chromium oxid.

2. A composition of matter adapted to produce synthetic green spinels, and containing aluminium, magnesium, titanium and chromium in such proportions that when heated to a suitable temperature there will be produced a mass containing substantially 82.53% aluminium oxid, 16.506% magnesium oxid, 0.066% titanium oxid, and 0.099% chromium oxid.

In testimony whereof I affix my signature.

ERNST G. SANDMEIER.